(12) United States Patent
Babb et al.

(10) Patent No.: US 7,870,146 B2
(45) Date of Patent: Jan. 11, 2011

(54) DATA MAPPING BETWEEN API AND PERSISTENT MULTIDIMENSIONAL OBJECT

(75) Inventors: Kenneth Alan Babb, Overland Park, KS (US); Brian T. Paulsen, Overland Park, KS (US)

(73) Assignee: International Business Machines Corporation, Armonk, NY (US)

( * ) Notice: Subject to any disclaimer, the term of this patent is extended or adjusted under 35 U.S.C. 154(b) by 1314 days.

(21) Appl. No.: 10/041,405

(22) Filed: Jan. 8, 2002

(65) Prior Publication Data

US 2003/0131017 A1    Jul. 10, 2003

(51) Int. Cl.
G06F 17/30    (2006.01)
(52) U.S. Cl. .................... 707/763; 707/706
(58) Field of Classification Search .......... 707/102, 707/100, 4
See application file for complete search history.

(56) References Cited

U.S. PATENT DOCUMENTS

| | | | | |
|---|---|---|---|---|
| 5,065,149 A | * | 11/1991 | Marsh et al. | 345/698 |
| 5,295,256 A | * | 3/1994 | Bapat | 717/137 |
| 5,329,619 A | | 7/1994 | Page et al. | |
| 5,627,979 A | * | 5/1997 | Chang et al. | 345/763 |
| 5,694,598 A | | 12/1997 | Durand et al. | |
| 5,737,736 A | | 4/1998 | Chang | |
| 5,797,137 A | | 8/1998 | Golshani et al. | |
| 5,809,505 A | * | 9/1998 | Lo et al. | 707/102 |
| 5,809,509 A | | 9/1998 | Blackman et al. | |
| 5,875,333 A | | 2/1999 | Fish et al. | |
| 5,878,411 A | | 3/1999 | Burroughs et al. | |
| 5,956,725 A | | 9/1999 | Burroughs et al. | |
| 5,991,382 A | * | 11/1999 | Bayless et al. | 379/136 |
| 6,122,641 A | | 9/2000 | Williamson et al. | |
| 6,163,781 A | | 12/2000 | Wess, Jr. | |
| 6,233,582 B1 | * | 5/2001 | Traversat et al. | 707/102 |
| 6,334,126 B1 | * | 12/2001 | Nagatomo et al. | 707/4 |
| 6,477,536 B1 | * | 11/2002 | Pasumansky et al. | 707/102 |
| 2002/0091702 A1 | * | 7/2002 | Mullins | 707/100 |
| 2003/0071818 A1 | * | 4/2003 | Wilt et al. | 345/537 |

OTHER PUBLICATIONS

Feigenbaum, B.A., "Retained Graphic Images for Object-Oriented Languages," IBM Technical Disclosure Bulletin, vol. 40 No. 07 Jul. 1997. pp. 51-54.
"Compile-time verification of relational Database lock-types for persistent objects," IBM Research Disclosure, Sep. 1998.
Common Object Request Broker Architecture (CORBA).

* cited by examiner

Primary Examiner—Cam-Linh Nguyen
(74) Attorney, Agent, or Firm—Anna L. Linne; Hoffman Warnick LLC

(57) ABSTRACT

A system, method and program product that maps between an application program interface of a data source and a persistent multidimensional object, and vice versa. The system, method and program product map in a single step that reduces computational requirements. In one embodiment, the invention is JAVA-based to provide an easy to understand framework for Java developers to utilize when supporting integration with non-relational back end systems. The system, method and program product are instance based and, hence, are scalable vertically and horizontally.

13 Claims, 3 Drawing Sheets

DATA MAPPING BETWEEN API AND PERSISTENT MULTIDIMENSIONAL OBJECT

BACKGROUND OF THE INVENTION

1. Technical Field

The present invention relates generally to data mapping and more particularly to a system, method and program product for mapping data between a data source application program interface (API) and a persistent multidimensional object.

2. Related Art

With the expansion of Web-based services, the need to connect systems through a disparate set of custom application program interfaces (APIs) is also increasing. Various types of data mapping frameworks are used relative to current business-to-business relationships. One common data mapping framework is that between persisting objects to relational technology. However, the problem of how to map data structures and data streams from remote APIs into business objects that are multidimensional and have requirements to persist state changes through similar APIs has not been adequately addressed.

Where such mapping services are required, it is generally necessary to design a custom built mapping solution. Most of these custom built mapping solutions are brittle and demanding to maintain. Existing middleware solutions could be leveraged in replace of custom built mapping solutions, but they require more than one mapping between, for instance, a platform and the targeted back end system. For instance, additional mappings are required by MQ Integrator®, Mercator®, EDI-based systems and other non-JAVA solutions. Where performance requirements are high and total cost of maintenance a concern, additional mappings are unacceptable.

In view of the foregoing, there is a need in the art for a system, method and program product for mapping data between an API and a persistent multidimensional object.

SUMMARY OF THE INVENTION

The present invention provides a system, method and program product that maps between an API and a persistent multidimensional object, and vice versa, and provides a generic transaction service. The system, method and program product are, in one embodiment, JAVA-based to provide an easy to understand framework for Java developers to utilize when supporting integration with non-relational back end systems. The system, method and program product are instance based and, hence, are scalable vertically and horizontally.

A first aspect of the invention is directed to a method of mapping a persistent object request to a data source through a defined application program interface and mapping a response back into a persistent multidimensional object, the method comprising the steps of: receiving a request for data from a requester; populating an access stream for the data source from the request; forwarding to the data source a fixed width delimited application program interface request stream through the access stream; receiving from the data source a fixed width delimited application program interface response data stream having data elements; and mapping the data elements from the response data stream into a persistent multidimensional object.

A second aspect of the invention provides a system for mapping data between a data source having an application program interface and a requester, the system comprising: a communicator that communicates between the data source and the requester; and a mapper that maps between an application program interface format of the data source and a persistent multidimensional object.

A third aspect of the invention is directed to a system for mapping data between a data source having an application program interface and a requester, the system comprising: means for communicating between the data source and the requester; and means for mapping in a single step between an application program interface format of the data source and a persistent multidimensional object.

A fourth aspect of the invention is directed to a computer program product comprising a computer useable medium having computer readable program code embodied therein for mapping data between a data source having an application program interface and a requester, the program product comprising: program code configured to communicate between the data source and the requestor; and program code configured to map between an application program interface format of the data source and a persistent multidimensional object.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DETAILED DESCRIPTION OF THE INVENTION

Figure 1:
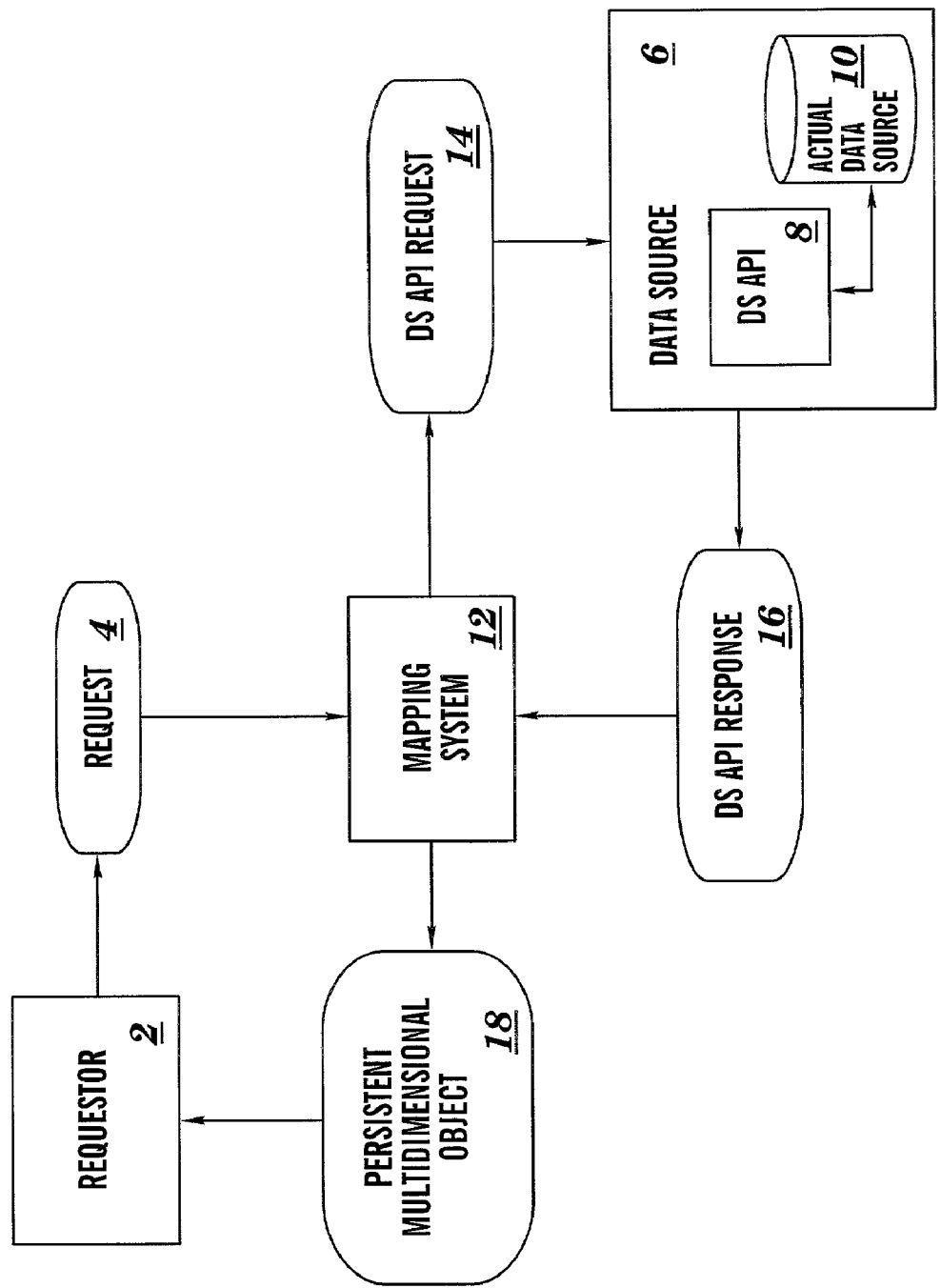
FIG. 1 shows a block diagram of an exemplary environment where the invention finds applicability.

FIG. 1 is a block diagram of one exemplary environment in which the present invention is applicable. In this environment, a requestor 2 places a request 4 for data to a data source 6 that has an application program interface 8 (DS API). DS API 8 may be any of a number of disparate interfaces that gather data from some sort of actual data source 10. For instance, data source 6 may be a stock quotient system, an inventory system, etc. Actual data source 10 may be any form of thing that can store data such as a relational database, flat file, XML, HTTP, etc.

In order for requestor 2 to communicate with data source 6, a mapping system 12 translates request 4 into a data source application program interface request 14 (DS API request) format. The DS API request 14 is in such a form that data source 6 can utilize the request to gather the requested data from actual data source 10.

In response, data source 6 creates a DS API response 16, which mapping system 12 translates to a persistent multidimensional object 18 that requestor 2 can use. The definition of "object" as used herein is as understood in object-oriented programming, i.e., a concrete realization of a class that consists of data and the operations associated with that data. In one preferred embodiment, the persistent multidimensional object may be a JAVA object. The persistent multidimensional object may also can contain other objects such as strings and characters.

Requestor 2 may be any non-relational back end system that can place a request for data. In one preferred embodiment, requestor 2 is a business object such as a JAVA management class that relates to a business functionality. For instance, for a financial business setting, requestor 2 may be an account, a customer, a trade, an exchange, etc. Practically any thing that has data, business rule, and business logic that can request data is possible. Requestor 2 may also be in the form of a persistent multidimensional object.

Figure 2:
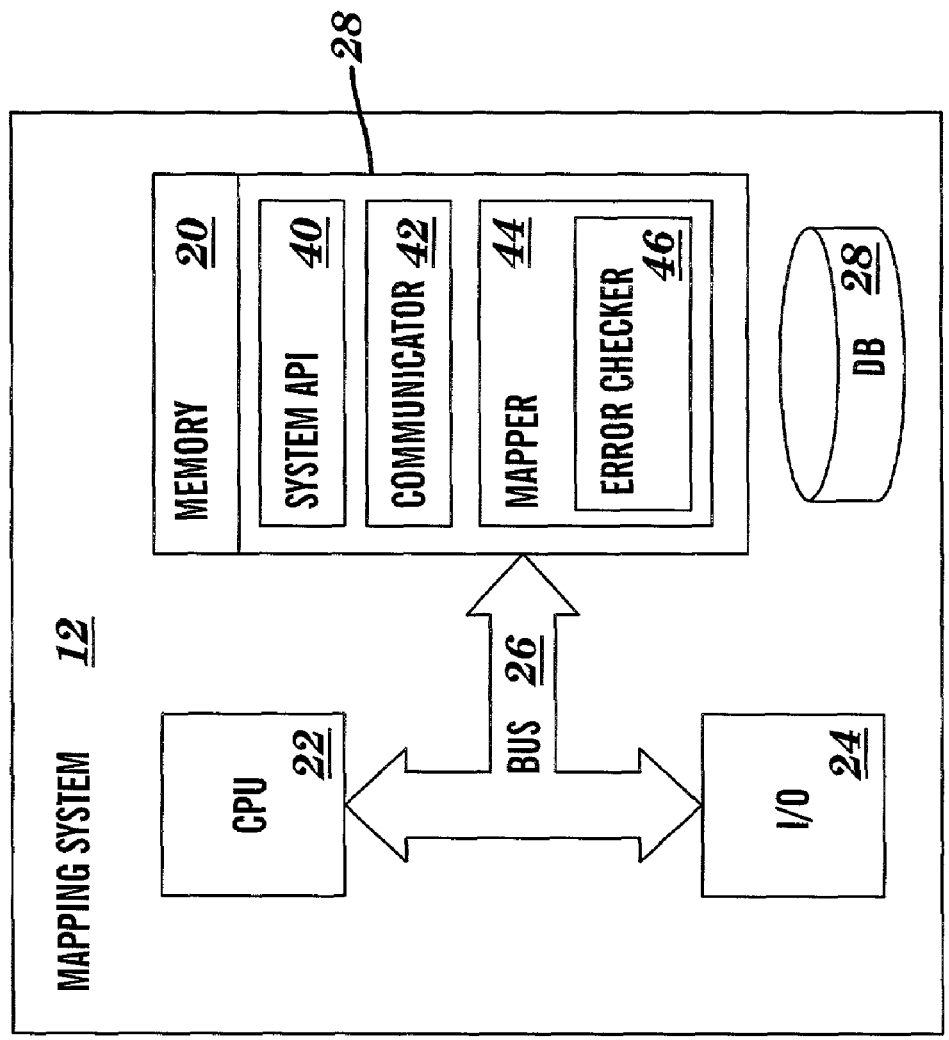
FIG. 2 shows a block diagram of a mapping system of FIG. 1.

Turning to FIG. 2, mapping system 12 preferably includes a memory 20, a central processing unit (CPU) 22, input/output devices (I/O) 24 and a bus 26. A database 28 may also be provided for storage of data relative to processing tasks. Memory 20 preferably includes a program product 28 that, when executed by CPU 22, comprises various functional capabilities described in further detail below. Memory 20 (and database 28) may comprise any known type of data storage system and/or transmission media, including magnetic media, optical media, random access memory (RAM), read only memory (ROM), a data object, etc. Moreover, memory 20 (and database 28) may reside at a single physical location comprising one or more types of data storage, or be distributed across a plurality of physical systems. CPU 22 may likewise comprise a single processing unit, or a plurality of processing units distributed across one or more locations. A server computer typically comprises an advanced mid-range multiprocessor-based server, such as the RS6000 from IBM, utilizing standard operating system software, which is designed to drive the operation of the particular hardware and which is compatible with other system components and I/O controllers. I/O 24 may comprise any known type of input/output device including a network system, modem, keyboard, mouse, scanner, voice recognition system, CRT, printer, disc drives, etc. Additional components, such as cache memory, communication systems, system software, etc., may also be incorporated into system 12.

As shown in FIG. 2, program product 28 may include a system application program interface 40, a communicator 42 and a mapper 44. Mapper 44 may also include an error checker 46.

Figure 3:
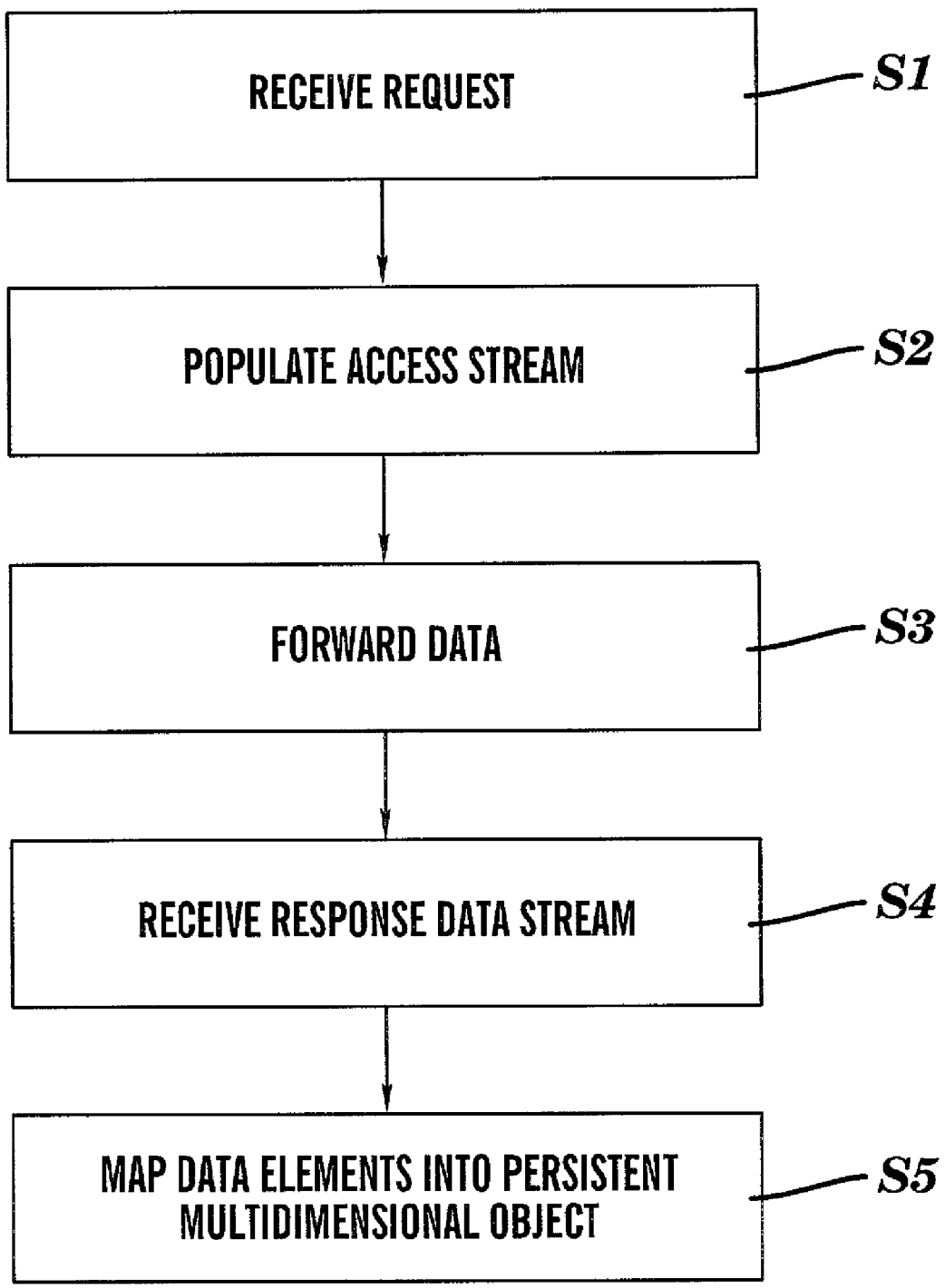
FIG. 3 shows a flow diagram of the logic of the mapping system of FIG. 2.

Turning to FIG. 3, the logic of mapping system 12 and the method of the invention will be described in greater detail. While the logic and method will be described in terms of a request 4 being mapped for use by data source 6 and a response 16 being mapped to a persistent multidimensional object, it should be recognized that system 12 does not require application in both directions. That is, system 12 may find application in mapping from requestor-to-data source or data source-to-requestor individually. In the appended claims, any of the above situations will be cumulatively referred to a mapping "between an application program interface format of the data source and a persistent multidimensional object." The logic of mapping system 12 may be implemented in a variety of languages, but one preferred embodiment uses JAVA.

In a first step S1, a request 4 for data is received by mapping system API 40 from a requestor 2. The request may be in a variety of forms. In one embodiment, the request is an object. The request may also be a persistent multidimensional object.

In step S2, the request is mapped to populate an access stream (DS API request) for data source 6 by mapper 44. This step involves populating an access stream that DS API 8 understands and can utilize to gather data from actual data source 10, i.e., a DS API format. This step occurs in a single step and, hence, reduces computational requirements compared to other systems that require two or more intermediate mappings.

In step S3, a fixed width delimited application program interface request stream is forwarded to data source 6 through the access stream. This step involves forwarding the access stream to communicator 42, which flattens the request into a string or other data structure, and determines the proper routing and protocol to use. In one preferred embodiment, the protocol is TCP/IP. However, other service protocols can be used.

Next, data source 6 receives the access stream and gathers the requested information. At step S4, a fixed width delimited DS API response 16, in a DS API format, is received by communicator 42 and is communicated to system API 40. The response 16 includes data elements that include the requested information and other necessary identification information. Response 16 may take a variety of forms. For instance, response 16 may be a stream, XML, HTTP and/or other data structures. DS API 8 defines how the response is to be broken up to retrieve information.

In step S5, mapper 44 maps the data elements from the response data stream 16 into a persistent multidimensional object 18. As an alternative, an error checker 46 may check the response data stream 16 for errors. If an error is found, the error is thrown as one of the defined system exceptions. If no errors are found, the response 16 is parsed and mapper 44 maps the data elements as stated above. The step of mapping also occurs in a single step and, hence, reduces computational requirements compared to other systems that require two or more intermediate mappings.

In the previous discussion, it will be understood that the method steps discussed preferably are performed by a processor, such as CPU 14 of system 8, executing instructions of program product 22 stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method of mapping a persistent object request to a data source through a defined application program interface and mapping a response back into a persistent multidimensional object, the persistent multidimensional object being a concrete realization of a class that consists of data and an operation associated with the data, the method comprising the steps of:

receiving a request for data from a non-relational back end system requester;

populating an access stream in an application program interface format for the data source from the request;

forwarding a fixed width delimited application program interface request stream to the data source through the access stream;

receiving from the data source a fixed width delimited application program interface response data stream having data elements; and mapping the data elements from the response data stream in the application program interface format into a persistent multidimensional object in a format different than the application program interface format.

2. The method of claim 1, wherein the step of mapping occurs in a single step.

3. The method of claim 1, wherein the step of populating occurs in a single step.

4. A system for mapping data between a data source having an application program interface and a non-relational back end system requestor, the system comprising:

a communicator that communicates between the data source and the requestor; and a mapper that maps a request from the requester to a request in a format of the application program interface and that maps a response from the data source in the format of the application program interface to a persistent multidimensional object in a format different than the application program interface format, the persistent multidimensional object being a concrete realization of a class that consists of data and an operation associated with the data.

5. The system of claim 4, wherein the requestor places a request in the form of an object.

6. The system of claim 4, wherein the application program interface format utilizes a fixed width data stream.

7. The system of claim 4, further comprising an application program interface for the mapper.

8. The system of claim 4, wherein the mapper includes an error checker that determines the presence of an error in the response.

9. The system of claim 4, wherein the mapper maps in a single step.

10. A system for mapping data between a data source having an application program interface and a non-relational back end system requestor, the system comprising:

means for communicating between the data source and the requestor; and means for mapping in a single step a request from the requester to a request in a format of the application program interface and for mapping a response from the data source in the format of the application program interface to a persistent multidimensional object in a format different than the application program interface format, the persistent multidimensional object being a concrete realization of a class that consists of data and an operation associated with the data.

11. A computer program product comprising a computer useable medium having computer readable program code embodied therein for mapping data between a data source having an application program interface and a non-relational back end system requestor, the program product comprising:

program code configured to communicate between the data source and the requestor; and program code configured to map a request from the requester to a request in a format of the application program interface and to map a response from the data source in the format of the application program interface to a persistent multidimensional object in a format different than the application program interface format, the persistent multidimensional object being a concrete realization of a class that consists of data and an operation associated with the data.

12. The program product of claim 11, wherein the code configured to map maps in a single step.

13. The program product of claim 11, wherein the code configured to map includes program code configured to check the response for errors.

* * * * *